United States Patent
Keith (10) Patent No.: US 9,439,368 B2
(45) Date of Patent: Sep. 13, 2016

(54) APPARATUS AND SYSTEM FOR IRRIGATION WATER

(71) Applicant: Robert Keith, Casper, WY (US)

(72) Inventor: Robert Keith, Casper, WY (US)

( * ) Notice: Subject to any disclaimer, the term of this patent is extended or adjusted under 35 U.S.C. 154(b) by 0 days.

(21) Appl. No.: 14/551,001

(22) Filed: Nov. 22, 2014

(65) Prior Publication Data

US 2016/0143232 A1    May 26, 2016

(51) Int. Cl.
*B05B 3/00* (2006.01)
*A01G 25/00* (2006.01)
*B05B 3/12* (2006.01)
*A01G 25/09* (2006.01)
*E02B 5/00* (2006.01)
*E02B 13/00* (2006.01)

(52) U.S. Cl.
CPC ............... *A01G 25/09* (2013.01); *E02B 5/00* (2013.01); *E02B 13/00* (2013.01)

(58) Field of Classification Search
None
See application file for complete search history.

(56) References Cited

U.S. PATENT DOCUMENTS

| 4,184,789 A * | 1/1980 | Gilde, Jr. ............. | A01G 25/092 210/170.01 |
| 6,616,374 B2 * | 9/2003 | Starr .................... | A01G 25/092 239/728 |
| 7,007,871 B2 * | 3/2006 | Parod .................... | A01G 25/09 239/193 |
| 2010/0127103 A1 * | 5/2010 | Toman ................ | A01G 25/092 239/726 |

* cited by examiner

*Primary Examiner* — Amber Anderson
*Assistant Examiner* — Douglas S Wood
(74) *Attorney, Agent, or Firm* — Peter J. Timbers

(57) ABSTRACT

An apparatus for directing apportion of a flow of water in an irrigated field having a pre-formed irrigation wheel track comprising a first trough capable of receiving a wheel of a mobile irrigation system, the first trough having an elevation. Further provided is an irrigation track system for directing a water flow having a pre-formed irrigation track comprised of (1) a first trough having an elevation and the first trough capable of receiving a wheel of a mobile irrigation system, (2) an irrigation reservoir having an elevation and (3) an irrigation canal having an elevation and connecting the first trough and the irrigation reservoir, the elevation of the first trough is higher than the elevation of the first irrigation reservoir and the elevation of the irrigation canal is higher than the elevation of the irrigation reservoir.

20 Claims, 8 Drawing Sheets

APPARATUS AND SYSTEM FOR IRRIGATION WATER

FIELD OF THE INVENTION

This invention relates generally to a method of conserving water previously wasted during the watering of irrigated fields.

BACKGROUND OF THE INVENTION

In agriculture, one current means of irrigating a field includes a mobile irrigation sprinkler, typically a pivot sprinkler system. The mobile irrigation sprinkler moves across a field and sprinkles water onto the crops planted in the field. The mobile irrigation sprinkler has wheels which provide a means for the irrigation sprinkler to move as the irrigation sprinkler irrigates the field with sprinkled water.

As the mobile irrigation sprinkler wheels traverse the field, ruts and grooves typically embed into the field, creating well-worn tracks. These tracks become ruts and grooves at an elevation below the remainder of the field. In time, the ruts and grooves grow deeper and deeper.

The ruts and grooves fill with water when it rains and during irrigation sprinkler operations. The water falling into the ruts and grooves is to some extent wasted, as it does not come into close enough contact with the plants that need the water. Further, the ruts and grooves, being comprised of dirt, become muddy. Movement of the mobile irrigation sprinkler through the muddy ruts and grooves becomes difficult as the irrigation sprinkler wheels become bogged down the in mud and dirt in the ruts and grooves. Much effort, time and money can be wasted extracting the mobile irrigation sprinkler wheels from the muddy ruts and grooves. The effort, time and money required to maintain mobile irrigation sprinkler movement could be better used for other purposes. Thus, there is a long felt need to save water, effort, time and money in the current mobile irrigation system agricultural arts.

SUMMARY OF THE INVENTION

Accordingly, it is an object of embodiments of the present invention to provide an apparatus and an irrigation track system for an irrigated field, which can direct water flow obtained during irrigation to an irrigation reservoir for recycled use of the water and ease of irrigation sprinkler movement.

To achieve the foregoing and other objects, and in accordance with the purposes of the present invention, as embodied and broadly described herein, the apparatus and irrigation track system is presented herein. The apparatus for directing the flow of some of the water in an irrigated field comprises a pre-formed irrigation wheel track having a first trough having an elevation and capable of receiving a wheel of a mobile irrigation system sprinkler. The irrigation track system directs water flow accumulated in the trough.

In another embodiment, the invention comprises an irrigation track system for directing a water flow, the irrigation track system comprising a pre-formed irrigation track comprised of (1) a first trough having an elevation and said first trough capable of receiving a wheel of a mobile irrigation system, (2) an irrigation reservoir having an elevation and (3) an irrigation canal having an elevation and connecting the first trough and the irrigation reservoir, said elevation of said first trough is higher than the elevation of said first irrigation reservoir and said elevation of said irrigation canal is higher than the elevation of said irrigation reservoir.

The apparatus and irrigation track system provided herein provide a means to save the water that previously stood in the irrigation wheel ruts of a mobile irrigation system. The water enters the apparatus and system of the present invention and does not create muddy puddles, but rather, the water flows from the troughs to an irrigation canal and eventually to an irrigation reservoir. The water held in the irrigation reservoir can be re-used for multiple other uses, including irrigating the instant field or another field.

Benefits and advantages of the present invention include, but are not limited to, an apparatus and system, which functions to economically save water and prevent muddy puddles that can bog down the motion of a mobile irrigation sprinkler system.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Reference will now be made in detail to embodiments of the invention, examples of which are illustrated in the accompanying drawings. Throughout the following detailed description, the same reference characters refer to the same or similar elements in all figures.

Figure 1:
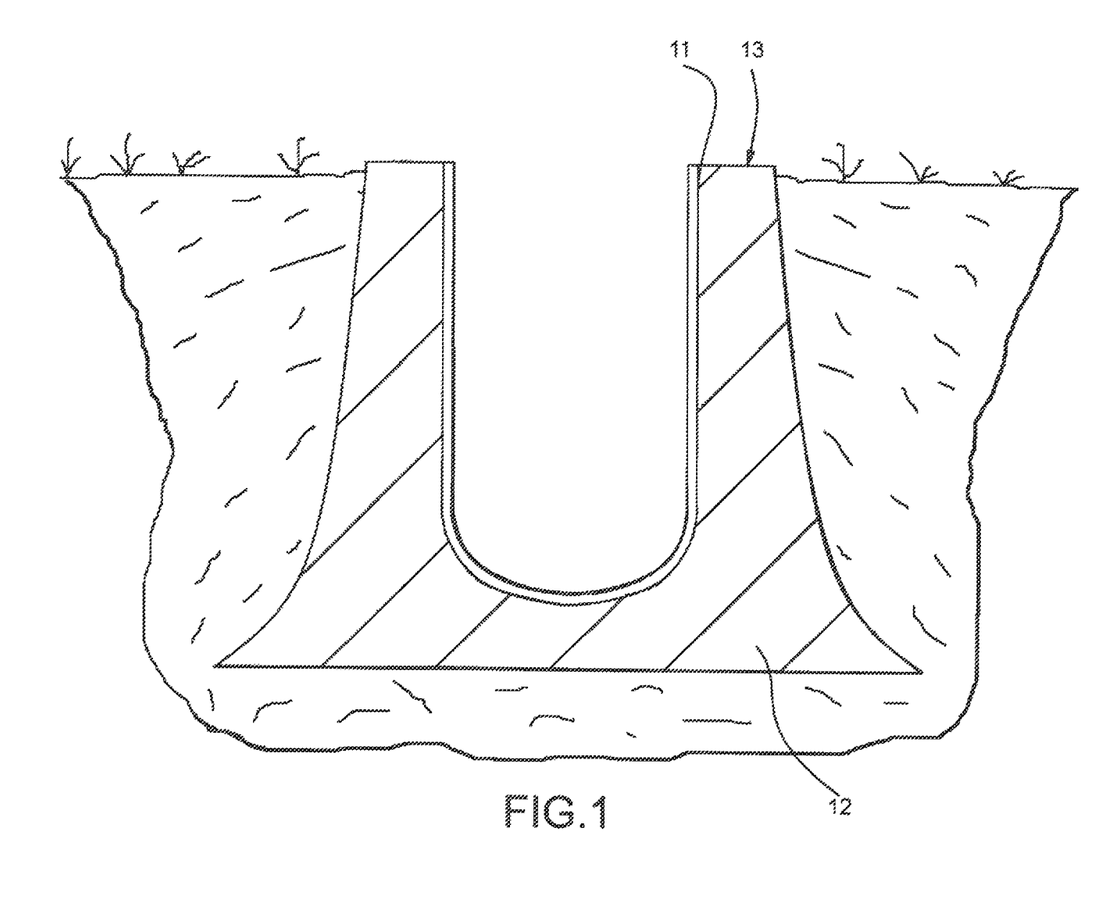
FIG. 1 illustrates a side planar view of one embodiment of the instant invention, namely the trough.

FIG. 1 depicts the trough 11 embedded in a field. A footer 12 and side support 13 are between the trough 11 and the field. The trough is comprised of materials including, but not limited to, plastics, metals, wood, and other synthetics. The materials comprising the trough should be water resistant and of sufficient strength to hold water and the weight of the irrigation sprinkler. The trough should also be constructed of material that will not rot and can accommodate extreme temperature fluctuations.

The trough 11 receives the wheel of the mobile irrigation sprinkler system and depending upon the depth of the trough, it would also potentially be wide enough to receive the irrigation sprinkler wheel supports attached to the irrigation sprinkler wheel. The wheel rolls along the trough as the sprinkler irrigation system moves during irrigation operations. It is contemplated that there are multiple trough shapes that could accommodate the wheel of the sprinkler irrigation system; however, a U-shaped trough comprises one preferred embodiment of the instant invention. In use in a pivot irrigation system, the trough would extend in a semi-circle or circle to accommodate the wheel tracks of the mobile irrigation system sprinkler.

Figure 2:
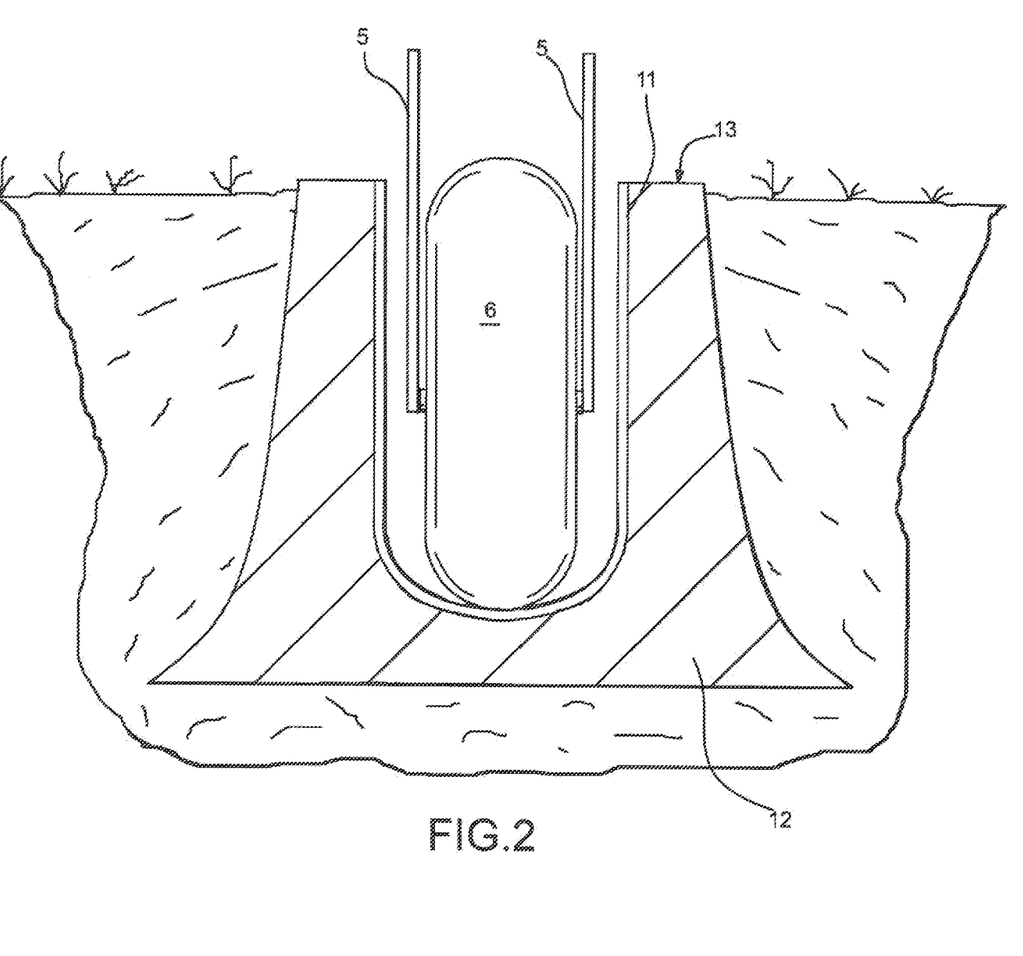
FIG. 2 illustrates a side planar view of one embodiment of the present invention with an irrigation wheel at the bottom the trough.

FIG. 2 shows the trough 11, the footer 12 and side support 13, as well as the irrigation sprinkler wheel 6 and the wheel supports 5.

Figure 3:
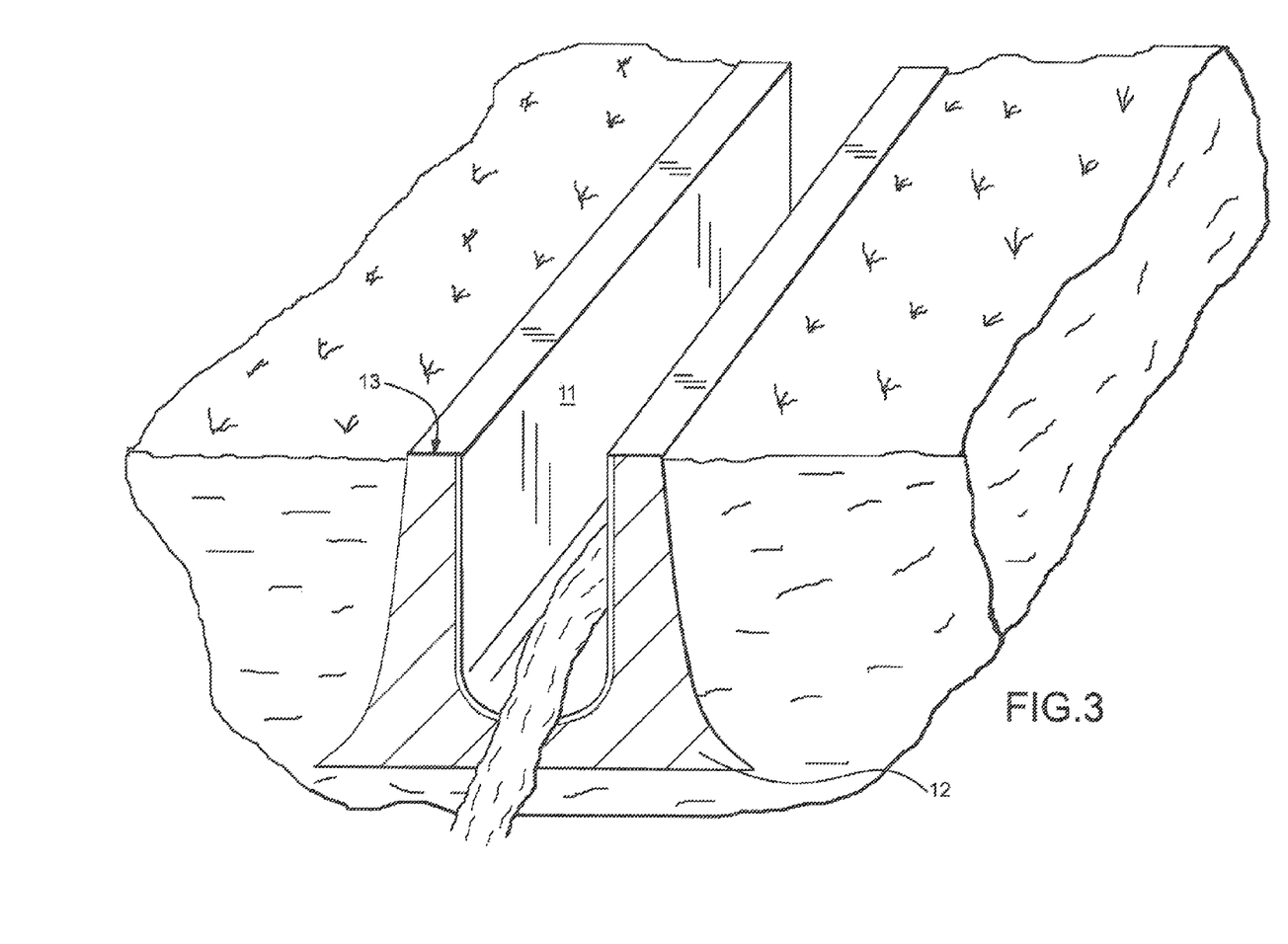
FIG. 3 illustrates a perspective side and top view of one embodiment of the present invention wherein water is flowing down the trough.

FIG. 3 depicts the trough and water flowing in the trough. In use, the troughs in the system are not of equal elevation. The invention requires that the one trough be higher than the trough next to it. It is also helpful if one portion of the trough is at a higher elevation than another portion of the same trough, then the water in a higher portion of the trough gravimetrically flows to a lower portion of the trough, which would be connected to an irrigation canal to accommodate water flow out of the trough.

Figure 4:
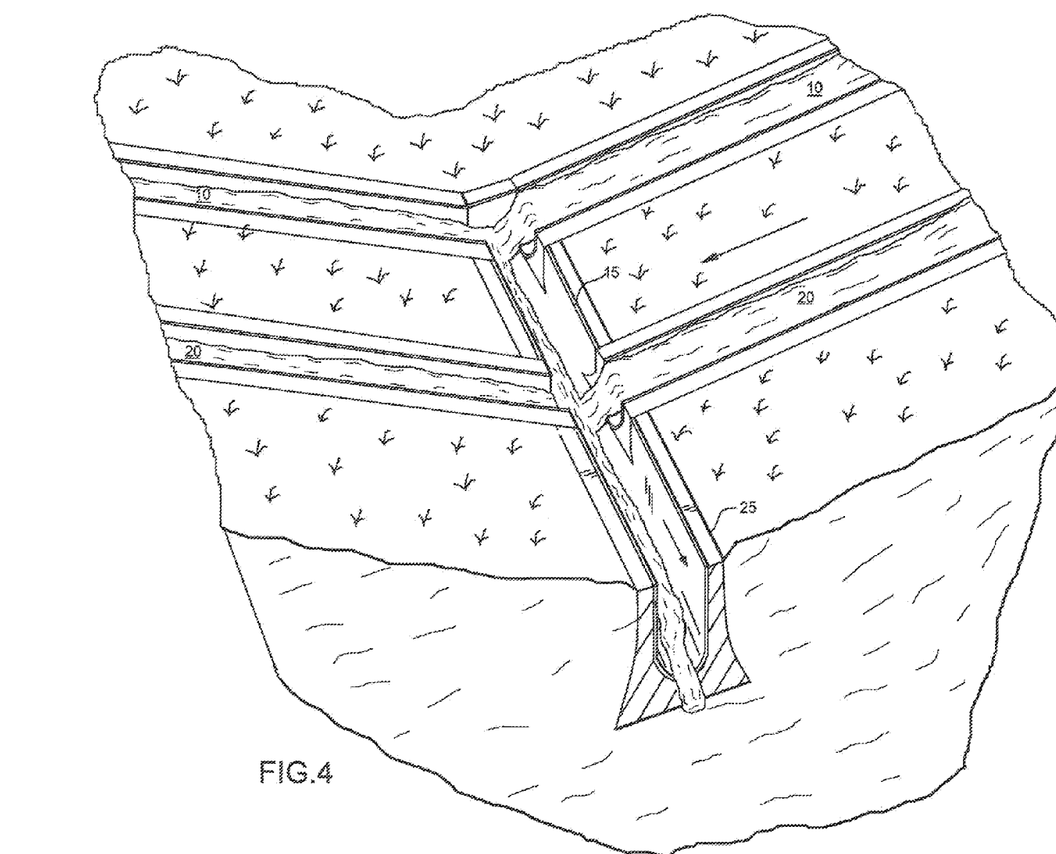
FIG. 4 illustrates perspective side and top view of one embodiment of the present invention, similar to FIG. 3; however, FIG. 4 further depicts water flowing from multiple troughs into irrigation canals.

FIG. 4 depicts a trough 10 at an elevation higher than that of the trough 20 and higher in elevation than the irrigation canal 15. The water flows from the elevated right and left sides of the trough 10 into the irrigation canal 15. Water then flows from the irrigation canal 15 into the irrigation canal 25, which is at a lower elevation than the irrigation canal 15 and the trough 20.

Figure 5:
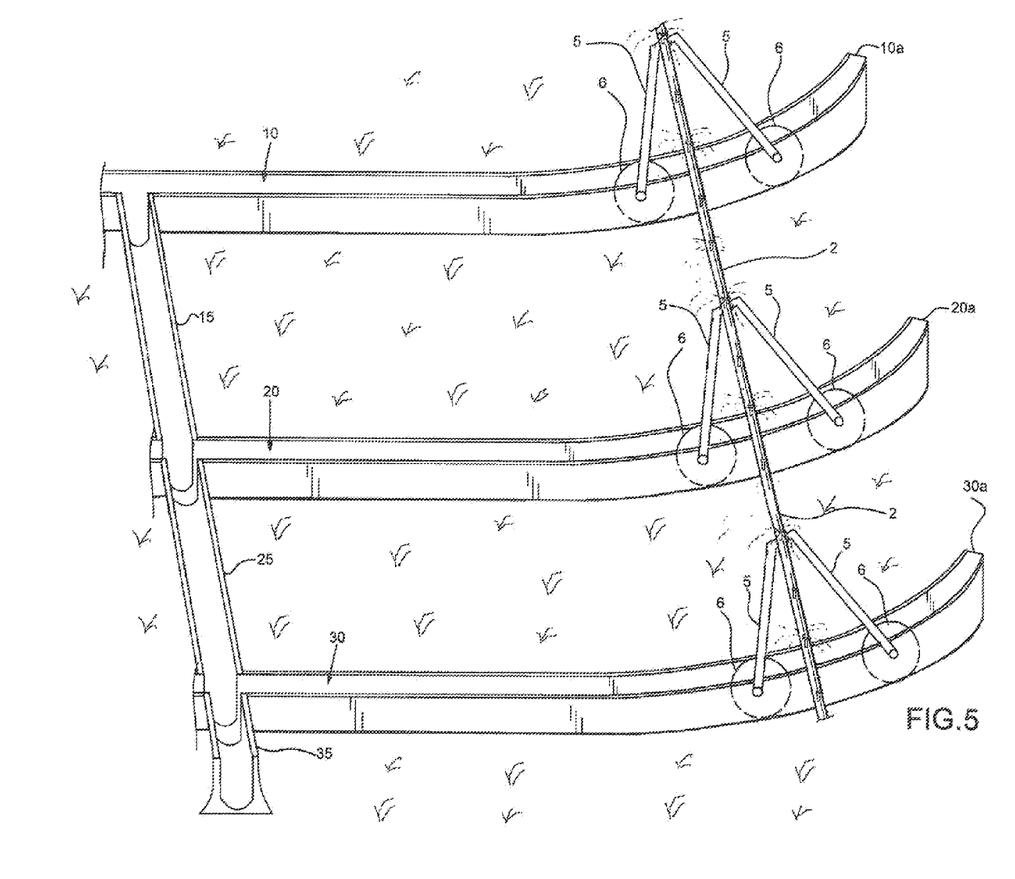
FIG. 5 illustrates perspective side and top view of one embodiment of the present invention wherein multiple troughs and irrigation canals are depicted as well as the irrigation system having wheels in the troughs.

FIG. 5 depicts an irrigation track system showing an irrigation sprinkler system 2 with its wheels 6 and wheel supports 5. The irrigation system rides in the multiple troughs 10, 20 and 30. In this depiction, the irrigation sprinkler system 2 would sprinkle water into the field, irrigating the crops. However, some portion of the water from the irrigation sprinkler would land and accumulate in the troughs 10, 20 and 30. In this depiction, the trough 10 is at a higher elevation than the irrigation canal 15, which is at a higher elevation than the irrigation 20, which is at a higher elevation than the irrigation canal 25, which is at a higher elevation that the trough 30, which is at a higher elevation than the irrigation canal 35.

FIG. 5 shows the trough caps 10a, 20a and 30a, each cap covers the end of troughs 10, 20, and 30, respectively. These caps prevent the water in the troughs from flowing out of the troughs and help to avoid puddles which would waste water and could impede irrigation sprinkler travel and mobility. Although only three troughs are depicted in this picture, it is contemplated within the scope of the invention that multiple, i.e., fourth, fifth, sixth, etc. troughs could be added to this system to accommodate a longer irrigation sprinkler.

Figure 6:
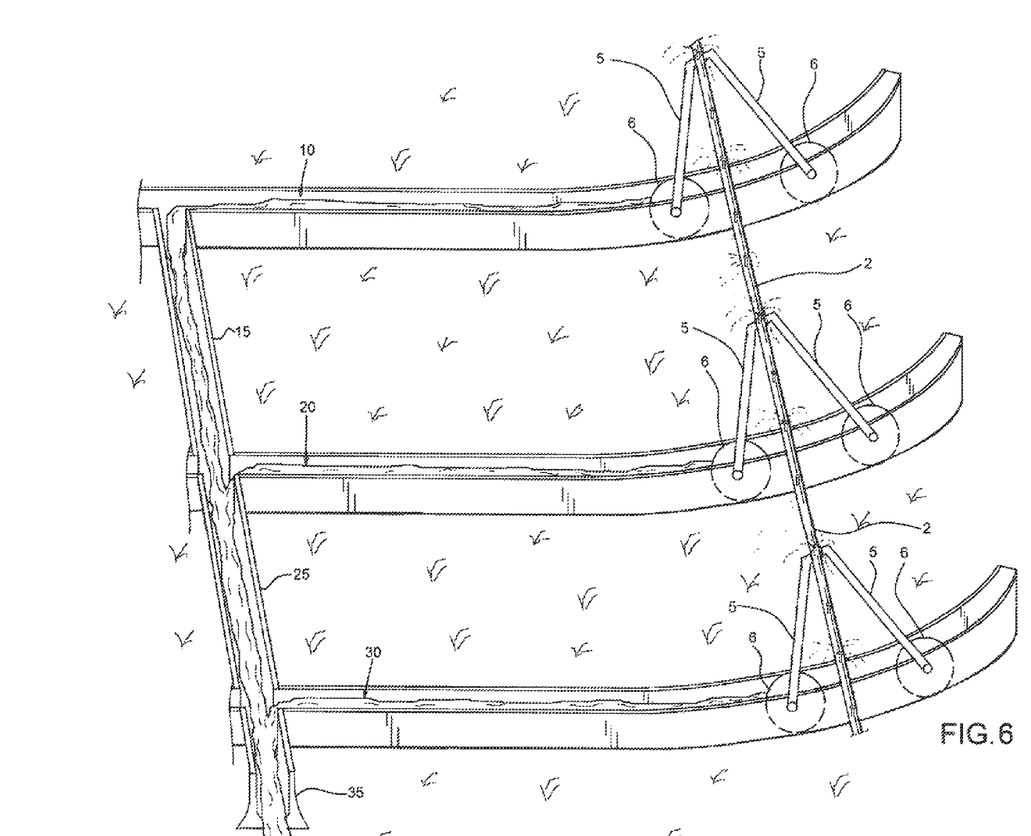
FIG. 6 illustrates perspective side and top view of one embodiment of the present invention, similar to FIG. 5; however, FIG. 6 further depicts water flowing from multiple troughs into an irrigation canal and then into an irrigation canal.

FIG. 6 depicts water flowing from the irrigation sprinkler into the field. Some portion of the water from the irrigation sprinkler system to would flow into the troughs 10, 20 and 30, as well as the irrigation canals 15, 25 and 35. The water would gravimetrically flow from the highest point of elevation in around trough 10 to a lower point of elevation in and around trough 20 via irrigation canal 15, having an elevation between the elevation of trough 10 and the elevation of trough 20. Water would similarly and gravimetrically flow from a higher point of elevation in and around trough 20 to an area lower in elevation in and around trough 30 via irrigation canal 25. Water from in and around trough 30 would flow similarly and gravimetrically to irrigation canal 35 into an irrigation reservoir, not depicted.

Figure 7:
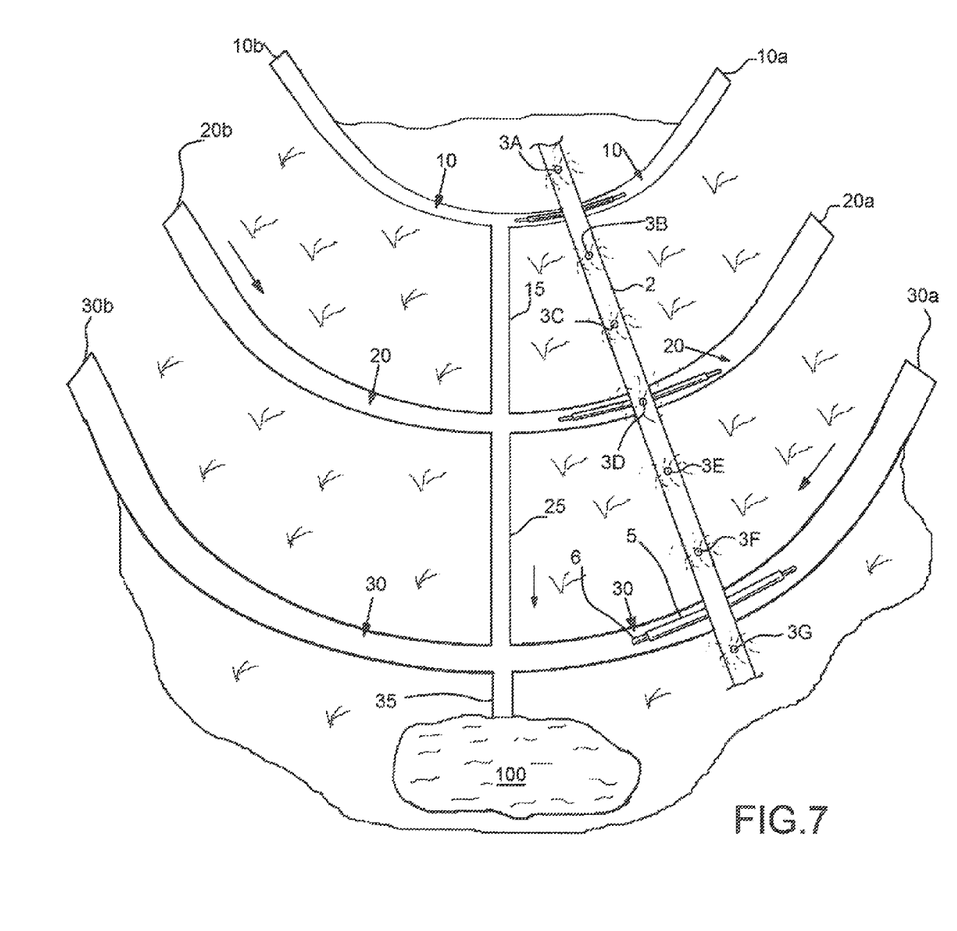
FIG. 7 illustrates top view of one embodiment of the present invention wherein multiple troughs, multiple irrigation canals, and an irrigation reservoir at the bottom of the field are depicted.

FIG. 7 depicts a pivot irrigation sprinkler 2 with sprinkler heads 3A, 3B, 3C, 3-D, 3E, 3F and 3G located on the top of the irrigation sprinkler 2 having wheels 6 and wheel supports 5. In FIG. 7, trough caps 10b, 20b and 30b are depicted. The irrigation track system of FIG. 7 would have the same elevations as depicted in FIG. 5 and FIG. 6. Therfore, water would flow from trough 10 to irrigation canal 15. Water from irrigation canal 15 would combine with water from trough 20 and flow into irrigation canal 25. Water from irrigation canal 25 would join with water from trough 30 and flow into irrigation canal 35. Water from irrigation canal 35 would flow into irrigation reservoir 100, the lowest elevation in the irrigation system. All water flows gravimetrically to the lowest point, irrigation reservoir 100.

It is contemplated within the scope of this invention that the field to be irrigated via the irrigation track system comprising this invention would have to be shaped to some extent via earth moving equipment into a configuration having the proper elevations to accommodate the invention and appropriate water flow through the trough and canals into an irrigation reservoir. While the earth and elevation preparation would take work and effort, the savings of water, time, effort and energy previously wasted makes the earth-moving effort and placement of the invention is well worth the cost.

Figure 8:
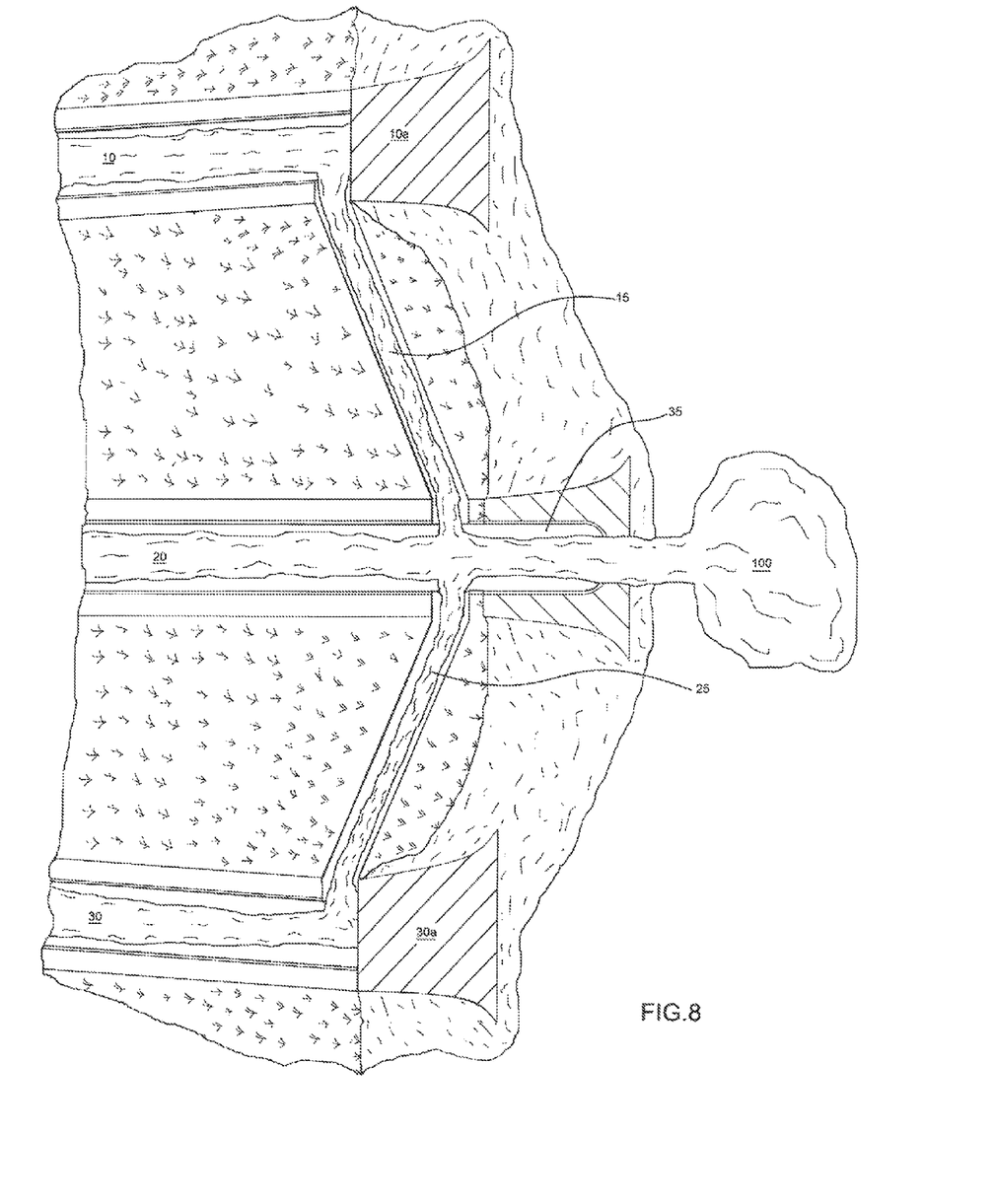
FIG. 8 illustrates top view of one embodiment of the present invention wherein multiple troughs, multiple irrigation canals, and an irrigation reservoir at the side of the field are depicted.

FIG. 8 shows an alternative track system configuration. The right side and middle of the field would be at a lower elevation than the remainder of the field. Thus, water from the trough 10 would flow via irrigation canal 15 into the irrigation canal 35 and then into irrigation reservoir 100. Similarly, water would flow from the trough 30 via the irrigation canal 25 and into the irrigation trough 35 and into the irrigation reservoir 100. Water from the left side of the trough 20 would also flow into the irrigation trough 35 and then into the irrigation reservoir 100.

It is believed that the apparatus of the present invention and many of its attendant advantages will be understood from the foregoing description. It is also believed that it will be apparent that various changes may be made in the form, geometry, construction, and arrangement of the components without departing from the scope and spirit of the invention and without sacrificing its material advantages. The forms described are merely exemplary and explanatory embodiments thereof. It is the intention of the following claims to encompass and include such changes.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

What is claimed is:

1. An apparatus for directing apportion of a flow of water in an irrigated field, said apparatus comprising: a pre-formed irrigation wheel track comprising a first trough capable of receiving a wheel of a mobile irrigation system, said first trough having an elevation and said trough comprising a bottom portion in contact with two opposing and substantially parallel walls, said bottom portion and said two opposing and substantially parallel walls are integrally formed and said troughs are comprised of any material selected from the group consisting; of plastics, metals, wood, and other synthetics and said wheel of the mobile irrigation system being in contact with the bottom portion of said trough.

2. The apparatus of claim 1 further comprising a first irrigation canal attached to the first trough to accommodate the flow of water from the first trough, said first irrigation canal having an elevation and said irrigation canal elevation lower in elevation than the first trough elevation.

3. The apparatus of claim 2 further comprising an irrigation reservoir attached to the first irrigation canal, said irrigation reservoir capable of receiving water from the first irrigation canal, said irrigation reservoir having an elevation and said irrigation reservoir lower in elevation than said first irrigation canal.

4. The apparatus of claim 3 further comprising a second irrigation canal attached to the first irrigation trough, said second irrigation canal having an elevation and said second irrigation canal elevation being higher in elevation than the first trough elevation.

5. The apparatus of claim 4 further comprising a second trough attached to the second in irrigation canal, said second trough having an elevation and said second trough elevation being higher in elevation than said second irrigation canal elevation.

6. The apparatus of claim 5 further comprising a third irrigation canal attached to the second irrigation trough, said third irrigation canal having an elevation and said third irrigation canal elevation being higher in elevation than the second trough elevation.

7. The apparatus of claim 6 further comprising a third trough attached to the third irrigation canal, said third trough having an elevation and said third trough elevation being higher in elevation than said third irrigation canal elevation.

8. The apparatus of claim 7 further comprising a fourth irrigation canal attached to the third irrigation trough, said fourth irrigation canal having an elevation and said fourth irrigation canal elevation being higher in elevation than the third trough elevation.

9. The apparatus of claim 8 further comprising a fourth trough attached to the fourth irrigation canal, said fourth trough having an elevation and said fourth trough elevation being higher in elevation than said fourth irrigation canal elevation.

10. The apparatus of claim 9, wherein the first, second, third and fourth troughs are U-shaped.

11. The apparatus of claim 1, wherein at least the majority of the wheel is disposed in the first trough and the trough is U-shaped.

12. An irrigation track system for directing a water flow, the irrigation track system comprising a pre-formed irrigation track comprised of (1) a first trough having an elevation and said first trough capable of receiving a wheel of a mobile irrigation system, and said trough comprising a bottom portion in contact with two opposing and substantially parallel walls, said bottom and said two opposing and substantially parallel walls are integrally formed and said wheel of the mobile irrigation system being in contact with the bottom portion of said trough, (2) an irrigation reservoir having an elevation, (3) an irrigation canal having an elevation and connecting the first trough and the irrigation reservoir, said first trough elevation is higher than the elevation of said first irrigation reservoir and said irrigation canal elevation is higher than the elevation of said irrigation, and (4) said trough comprised of any material selected from the group consisting of plastics, metals, wood, other synthetics.

13. The irrigation track system of claim 12 farther comprising a second trough capable of receiving a second wheel of a mobile irrigation system and said second trough having an elevation higher than said first trough.

14. The irrigation track system of claim 13 farther comprising a second irrigation canal having an elevation and said second irrigation canal between and connecting said first trough to said second trough, the second irrigation canal being higher in elevation than said first trough and said second irrigation canal being lower in elevation than said second trough.

15. The irrigation track system of claim 14 further comprising a third trough capable of receiving a third wheel of a mobile irrigation system and said third trough having an elevation higher than said second trough.

16. The irrigation track system of claim 15 further comprising a third irrigation canal having an elevation and said third irrigation canal between and connecting said second trough to said third trough, the third irrigation canal being higher elevation than said second trough and said third irrigation canal being lower in elevation than said third trough.

17. The irrigation track system of claim 16 further comprising a fourth trough capable of receiving a fourth wheel of a mobile irrigation system and said fourth trough having an elevation higher than said third trough.

18. The irrigation track system of claim 17 further comprising a fourth irrigation canal having an elevation and said fourth irrigation canal between and connecting said third trough to said fourth trough, the fourth irrigation canal being higher in elevation than said third trough and said third irrigation canal being lower in elevation than said fourth trough.

19. The irrigation system of claim 18, wherein the first, second, third and fourth troughs are U-shaped.

20. The pre-formed track system of claim 12 wherein at least the majority of the wheel is disposed in the first trough the trough is U-shaped.

* * * * *